United States Patent [19]

Mori et al.

[11] Patent Number: 5,063,743
[45] Date of Patent: Nov. 12, 1991

[54] MASTER CYLINDER WITH PARTS ASSEMBLED FOR EASY REMOVAL

[75] Inventors: Kohei Mori; Riichirou Sugimoto, both of Higashimatsuyama, Japan

[73] Assignee: Jidosha Kiki Co., Ltd., Tokyo, Japan

[21] Appl. No.: 519,792

[22] Filed: May 7, 1990

[30] Foreign Application Priority Data

May 17, 1989 [JP] Japan .................. 1-56631[U]
Jun. 16, 1989 [JP] Japan .................... 1-70455

[51] Int. Cl.[5] .................. B60T 11/20; F01B 29/00
[52] U.S. Cl. ..................................... 60/562; 60/588; 92/128; 92/171.1
[58] Field of Search ............... 60/533, 578, 588, 589, 60/590, 562; 92/128, 171.1

[56] References Cited

U.S. PATENT DOCUMENTS

| | | | |
|---|---|---|---|
| 2,759,329 | 8/1956 | Ponti | 60/588 |
| 3,178,890 | 4/1965 | Wallace | 60/588 |
| 3,191,385 | 6/1965 | Watanabe | 60/562 X |
| 3,357,183 | 12/1967 | Krieger | 60/562 |
| 3,416,315 | 12/1968 | Wortz | 60/562 X |
| 4,198,825 | 4/1980 | Sakazume | 92/171.1 |
| 4,455,830 | 6/1984 | Gaiser et al. | 60/588 X |
| 4,455,832 | 6/1984 | Gaiser et al. | 60/588 X |
| 4,510,752 | 4/1985 | Gaiser | 92/171.1 X |
| 4,527,395 | 7/1985 | Gaiser et al. | 92/170.1 X |
| 4,559,781 | 12/1985 | Steer et al. | 60/578 X |
| 4,745,751 | 5/1988 | Gaiser | 60/578 |
| 4,790,138 | 12/1988 | Steer | 60/578 |
| 4,878,346 | 11/1989 | Metzelfeld et al. | 92/171.1 X |
| 4,909,131 | 3/1990 | Nix et al. | 60/588 X |
| 4,945,729 | 8/1990 | Hayashida et al. | 60/588 X |

FOREIGN PATENT DOCUMENTS

| | | | |
|---|---|---|---|
| 2624088 | 12/1976 | Fed. Rep. of Germany | 60/562 |
| 63-235151 | 9/1988 | Japan. | |
| 0959138 | 5/1964 | United Kingdom | 60/588 |
| 2025548 | 1/1980 | United Kingdom | 60/562 |
| 2030668 | 4/1980 | United Kingdom | 60/562 |

Primary Examiner—Edward K. Look
Assistant Examiner—John Ryznic

[57] ABSTRACT

In a master cylinder, a sleeve for guiding the piston and a cap for forming a cylinder housing are connected with each other and integrally formed, and a primary piston and a secondary piston are coupled with via a retainer and thus integrally formed. Consequently, when the master cylinder is disassembled, the sleeve and the piston can be pulled out simultaneously, thereby allowing the simultaneous withdrawal of the secondary and primary pistons.

19 Claims, 5 Drawing Sheets

MASTER CYLINDER WITH PARTS ASSEMBLED FOR EASY REMOVAL

FIELD OF THE INVENTION AND RELATED ART STATEMENT

The present invention relates to a master cylinder, and particularly to constructions of a piston guiding sleeve, a cylinder housing, a piston and a cylinder retainer.

FIG. 6 shows a traditional master cylinder.

In this master cylinder 1, a cylinder housing 2 is formed from a body 3 and a cap 4. The body 3 has an opening 3a at its one end and a female thread 3b along the peripheral surface inwardly of the opening 3a. On the other hand, the cap 4 has a male thread 4a formed at its one end along the outer peripheral surface thereof, and the cap 4 can be attached to the body 3 by engaging the male thread 4a with the female thread 3b in the body 3.

Arranged in the body 3 of the cylinder housing 2 are a piston guide 5 and packings 6, 7, and a secondary piston 8 is threaded to pass through the piston guide 5. Thus these piston 8, piston guide 5 and packings 6, 7 define two pressure chambers 9, 10 in the cylinder housing 2.

Arranged in the cap 4 of this cylinder housing 2 are a piston guide 11 and packings 12, 13, and a sleeve 14 is also arranged to span over the cap 4 and the body 3. A primary piston 15 is threaded to pass through the piston guide 11 and the sleeve 14.

The above-described pressure chambers 9 and 10 are provided with urging means, said urging means comprising telescoping type retainers 16 and 17 of which two portions 16a, 16b and 17a, 17b are slidably and undetachably coupled each other, and return springs 18 and 19 which are arranged on these retainers 16 and 17. Such urging means act to urge pistons 8 and 15 toward a direction of increasing the volume of pressure chambers 9 and 10.

In this master cylinder 1, when the cylinder 1 is in an inoperative state, the pressure chamber 9 is brought into communication with an oil reservoir 20 through a passage 8a bored through the piston 8, a passage 5a bored through the piston guide 5 and a passage 2a bored through the cylinder housing 2, whereas the pressure chamber 10 is brought into communication with a passage 15a bored through the piston 15, a passage 11a bored through the piston guide 11, a passage 21 formed between the cap 4 and the sleeve 14 and the passage 2b bored through the cylinder housing 2.

In such master cylinder 1, when the primary piston moves in a leftward direction, and the passage 15a of the piston 15 reaches to the packing 12, the communication between the pressure chamber 10 and the oil reservoir 20 is blocked, elevating a pressure inside the pressure chamber 10, and substantially at the same time, the secondary piston is moved toward a leftward direction, and the passage 8a of the piston 8 reaches to the packing 6, and thereby blocking a communication between the pressure chamber 9 and the oil reservoir 20, with a subsequential increase in the pressure inside the pressure chamber 9. Thus, oil inside the pressure chambers 10 and 9 is pumped under pressure to each of wheel cylinders (not shown) via ports 10a and 9a.

To pull out internal parts for maintenance etc., in such a master cylinder 1, the cap 4 is removed together with the packing 13, piston guide 11, packing 12 and the piston 15 by loosening the cap 4 off the body 3, and then the spring 19 is pulled out together with the retainer 17 to be followed by the removal of the sleeve 14. Furthermore, the packing 7, the piston guide 5 and the packing 6 are removed together with the piston 8 when pulling out internal parts, and finally the spring 18 is pulled out together with the retainer 16.

To reattach said parts in their original positions after replacement and the like, the packing 13, the piston guide 11, the packing 12 and the sleeve 14 are fitted to the primary piston 15, and then secured in position on the cap 4. Then, the spring 19 is secured to the piston 15 together with the retainer 17. On the other hand, the secondary piston 8 is attached with the packing 6, the piston guide 5 and the packing 7, whereas the piston 8 is attached with the spring 18 together with the retainer 16. The secondary piston 8 is attached with the sleeve 14 which has been attached to the cap 4 then the cap 4 is inserted into the body 3 together with the primary piston 15. The cap 4 is threadably engaged with the body 3 for thereby completing the assemblying procedure.

In this manner, it has been very cumbersome to disassemble and reassemble components of the traditional tandem type master cylinder 1 for the purpose of maintenance etc.,

OBJECT AND SUMMARY OF THE INVENTION

An object of the present invention is therefore to provide a tandem type master cylinder which facilitates disassembly and reattachment of its internal components.

To achieve the above object, the present invention provides a master cylinder, wherein a body and a cap which is threadably attached on the body are utilized to form the cylinder housing, a synthetic resin sleeve is received in said cap to locate the sleeve in said cylinder housing, a piston is freely slidable threaded to pass through the sleeve for thereby locating the piston in position inside the cylinder housing, said master cylinder being characterized in that a lug is defined through the outer periphery of the sleeve and a groove is defined through the inner periphery of the cap, and the sleeve is attached to the cap by engaging the lug in the groove.

In the master cylinder of the present invention, when it is attempted to remove the cap from the body for the purpose of maintenance etc.. a sleeve and a piston guide and the like which is sandwiched between the sleeve and the cap will also be pulled out together with the cap. To reattach the cap and the like, the cap is attached to the body together with the sleeve and the piston guide which have been previously fitted in place.

As described above, in the master cylinder of the present invention, the sleeve and the like can be removed and reattached again for maintenance together with the cap, since the sleeve is engaged with the cap of the cylinder housing, which serves to greatly improve a working efficiency. Moreover, there is no chance of the piston guide and the packings etc., which have been provided inside the cap previously to fall off the cap, even if the cap is attached to the body with the cap facing downwardly. Moreover, a work efficiency may be further improved and an erroneous attachment etc., may be avoided, by preparing the sleeve, the piston guide and the packing etc., which have been attached to the cap as a repair kit in stock, and replacing old parts with such kit at the time of maintenance.

In the second embodiment of the present invention, a tandem type master cylinder is provided, wherein a primary piston and a secondary piston are arranged in tandem with the urging means having a spring mounted upon a telescoping type retainer therebetween, said master cylinder being characterized in that said retainer has its one end fixed on said primary piston, and a pawl formed on said opposite end. A recess is formed in the end portion of the secondary piston and said pawl is received in the recess for thereby joining the primary piston and the secondary piston together.

In the master cylinder in accordance with the third embodiment of the present invention, a tandem master cylinder is provided, wherein a primary piston and a secondary piston are arranged in tandem with the urging means therebetween having a spring mounted upon a telescoping type retainer, said master cylinder being characterized in that the secondary piston has a recess formed through an end portion adjacent to the primary piston, said recess receiving the end of the spring adjacent to the secondary piston, an annular groove is defined through the inner peripheral wall of the recess, a flange is defined on the end of the retainer adjacent to the secondary piston, and furthermore the coil diameter of the spring at an end adjacent to the secondary piston is made larger than that at other portions the end of the spring adjacent to the secondary piston is received in the annular groove in the secondary piston, and thereby allowing the flange of the retainer adjacent to the secondary piston to be sandwiched between the spring and the secondary piston.

In the tandem type master cylinder in accordance with the second and the third embodiments of the invention, it is possible in a disassembling procedure to pull out the primary piston, together with the secondary piston and its urging means of the piston and then reattach them simultaneously.

In the tandem type master cylinder in accordance with the first and the second embodiments of the invention. substantially all parts inside the cylinder housing can be pulled out simultaneously by removing the cap, and this results in realizing a very easy disassembling procedure. Besides. since substantially all components have been attached on the cap beforehand prior to their refit in these master cylinders of the present invention, it is easy to identify components so that erroneous refit and fall of components may be prevented and a very easy refit may be accomplished.

In the master cylinder in accordance with the forth embodiment of the invention, the tandem type master cylinder is provided wherein the cylinder housing is formed from the body and the cap which is to be threaded on the body, a synthetic resin sleeve is engaged in the cap and then placed in position in the cylinder housing. the primary and the secondary pistons are provided in tandem with the urging means therebetween having the spring arranged on the telescoping type retainer, and said primary piston is freely slidable to pass through said sleeve, said master cylinder being characterized in that a lug is defined in the outer periphery of said sleeve and a groove is defined in the inner periphery of said cap, said sleeve is attached to said cap by engaging said lug in said groove , said retainer has its one end secured in position on said primary piston, and a pawl formed on its other end, said secondary piston has a recess formed on the end portion thereof, and said primary and said secondary pistons are coupled with each other by engaging said pawl in said recess.

In the master cylinder in accordance with the fifth embodiment of the present invention, a tandem type master cylinder is provided, wherein the cylinder housing is formed from the body and the cap which is to be threaded on the body, a synthetic resin sleeve is engaged in the cap and then placed in position in the cylinder housing, the primary and the secondary pistons are provided in tandem with the urging means therebetween having the spring arranged on the telescoping type retainer, and said primary piston is freely slidable to pass through said sleeve said master cylinder being characterized in that the secondary piston has a recess formed through an end portion adjacent to the primary piston, said recess receiving the end of the spring adjacent to the secondary piston, an annular groove is defined through the inner peripheral wall of the recess, a flange is defined on the end of the retainer adjacent to the secondary piston, and furthermore the coil diameter of the spring at an end adjacent to the secondary piston is made larger than that at other portions, the end of the spring adjacent to the secondary piston is attached in the annular groove in the secondary piston, thereby allowing the flange of the retainer adjacent to the secondary piston to be sandwiched between the spring and the secondary piston.

In the master cylinder in accordance with the fourth and the fifth embodiments of the present invention when the cap is removed from the body, it is made possible to remove the cap together with the sleeve, and consequently to remove the piston guide, and packings which are intervened between the sleeve and the cap simultaneously at the time of maintenance. Moreover, the primary piston against which packings are in abutment is also pulled out together with the secondary piston and the urging means. Moreover, with the withdrawal of the secondary piston, it is also possible to pull out packings which are in abutment with the piston, and the piston guide intervened between these packings. That is, in the master cylinder of the fourth and the fifth embodiments of the invention when the cap is removed from the body, all components :n the cylinder housing can be simultaneously pulled out together with the removal of the cap. Furthermore, to refit the components after replacement etc.. it is only necessary to threadably engage the cap with the body, the cap having each of components attached beforehand. Thus, the piston guide, the sleeve and another piston guide are located in position as sandwiched between the body and the cap.

Further scope of applicability of the present invention will become apparent from the detailed description given hereinafter. However, it should be understood that the detailed description and specific examples, while indicating preferred embodiments of the invention, are given by way of illustration only, since various changes and modifications with the spirit and scope of the invention will become apparent to those skilled in the art from this detailed description.

DETAILED DESCRIPTION OF PREFERRED EMBODIMENTS

Figure 1:
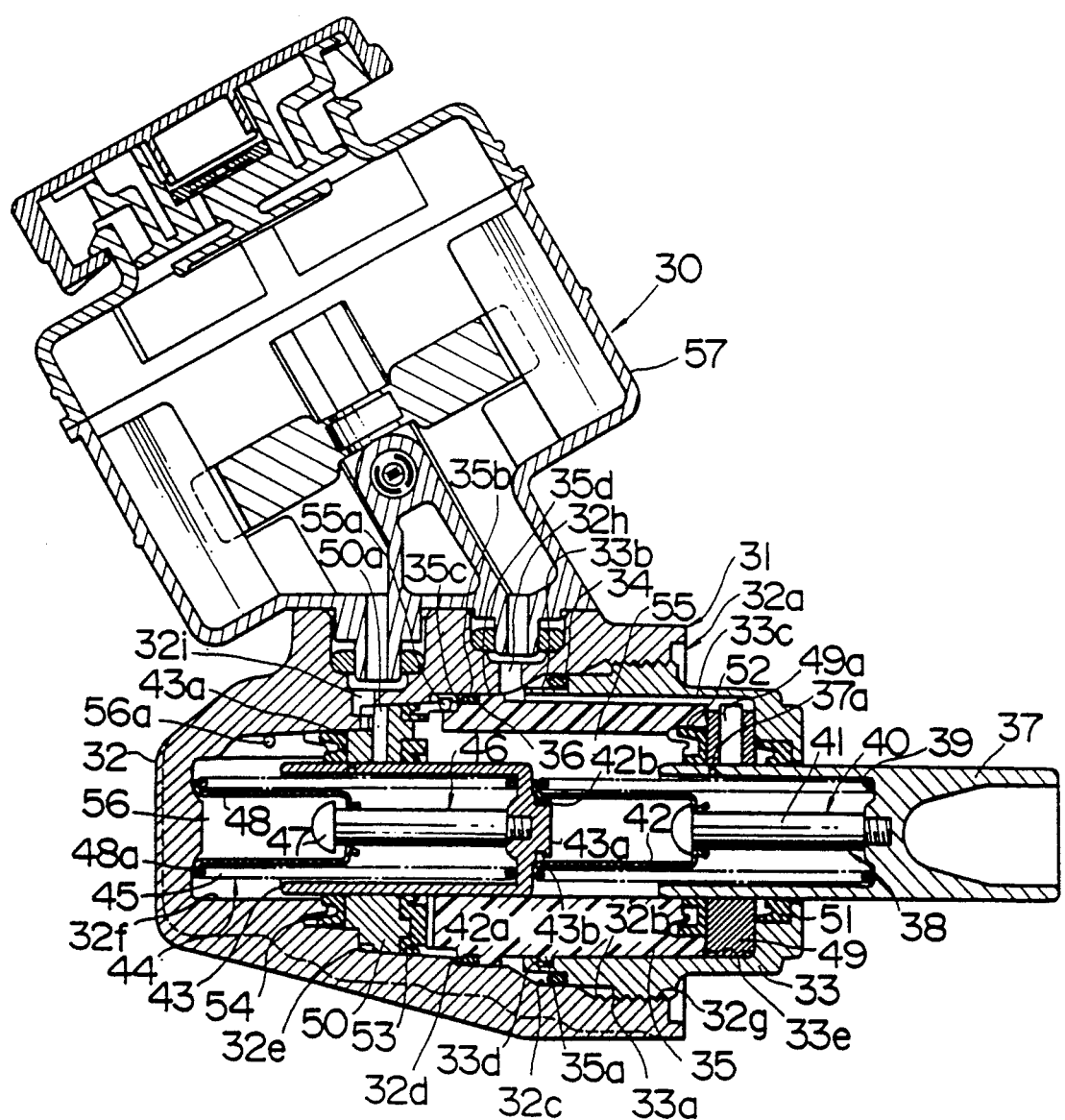
FIGS. 1 is a longitudinal cross-sectional view of the tandem type master cylinder in accordance with the present invention.

FIG. 1 shows a tandem type master cylinder in accordance with the present invention.

The master cylinder 30 has its cylinder housing 31 formed of a body 32 and a cap 33. The body 32 has an opening 32a defined through one end thereof. Formed in the body 21 are cylinder portions 32b, 32c, 32d, 32e and 32f having different diameters starting from the opening 32a. These cylinder portions are made to be smaller in diameter as they locate deeper in the body 32. A female thread 32g is formed along the peripheral surface of the cylinder. On the other hand, a male thread 33a is formed along the outer periphery of the cap 33. Compared to the male thread 33a, the tip end 33b is made to be slightly smaller in its outer diameter than the inner diameter of the cylinder portion 32c of said body 32.

An O ring 34 is engaged in the tip end 33b of the cap 33, and the cap 33 is engaged with the body 32 by threadably engaging the male thread 33a with the female thread 32g of the body 32 and threadably moving the cap 33. Thus, the 0 ring 34 is in abutment with the cylinder portion 32c of the body 32 and causes it to slide along the cylinder portion 32c as the cap is threadably moved, and thereby guiding the cap 33.

Figure 2A:
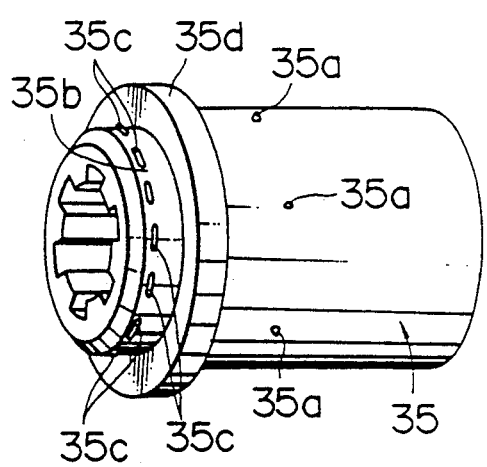
FIG. 2a and 2b are is a perspective view showing a retainer adjacent to the primary piston and a portion of the secondary piston respectively.
Figure 2B:
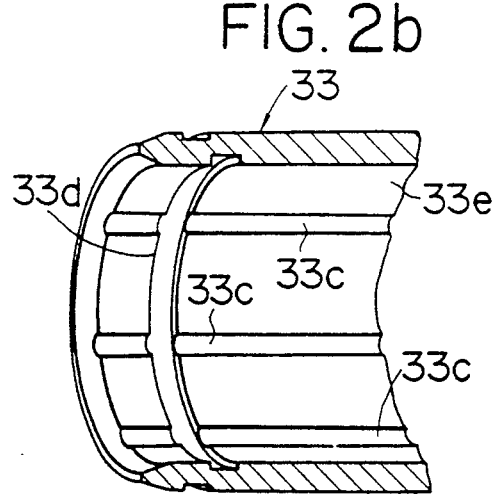
Figure 3A:
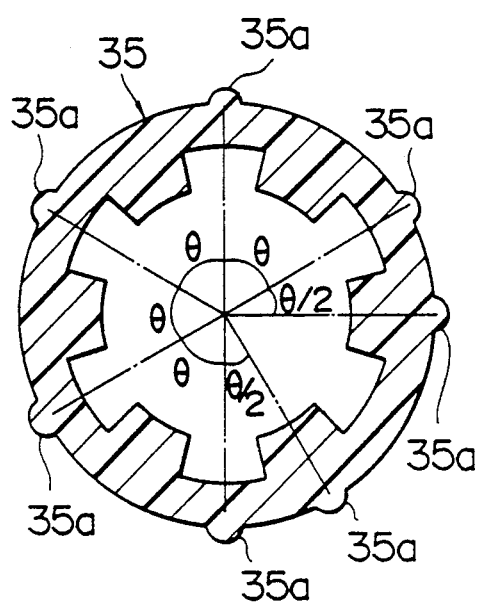
FIG. 3a and 3b are is a partial cross-sectional perspective view showing a portion of the sleeve and the cap respectively.
Figure 3B:
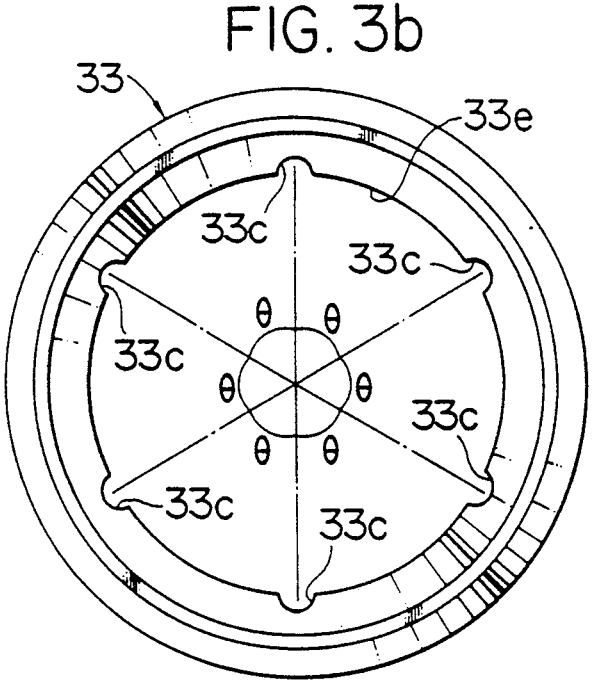

Furthermore, the cap 33 is provided with six recesses 33c having a center angle of $\theta$ in an equidistanced relationship in the axial direction of its inner periphery 33e, as shown in FIG. 2 and FIG. 3. An annular groove 33d is formed through the top end of the cap 33 to extend in the peripheral direction.

On the other hand, the sleeve which is to be attached in the cap 33 is formed from a synthetic resin and is produced by a molding process wherein the resin material is stamped in the axial direction. The sleeve 35 has seven lugs 35a formed on the outer periphery of the intermediate portion. Five of these seven lugs are arranged in an equidistanced relationship having the center angle $\theta$ equal with that of recess 33c of said cap 33, whereas remaining two luqs are arranged with a different center angle $\theta/2$. The lug 35a is formed by a undercut (forced stamp) molding procedure. This molding is carried out by flexing and then mold-releasing the lug 35a before the synthetic resin is sufficiently hardened.

The sleeve 35 causes five of seven lugs 35a to be received in the recess 33c in the cap 33 and pushed inwardly along the recess 33c. By so doing, other lugs on the sleeve 35 are press-fit into the inner periphery 33e of the cap 33 to reach the annular groove 33d and thereby being loosely inserted into the groove 33d.

Meanwhile, an annular recess 35b is defined through the outer periphery of the top end of the sleeve 35 for containing the O ring 36 therein. The recess 35b is formed with the lug 35c which are formed substantially in an equidistanced relationship and with a flange portion 35d, as shown in FIG. 2. The lug 35c is formed by a under-cut molding procedure, like that for the lug 35a. In the meantime, the lug 35c may be formed by stamping the material in a direction normal to its axis.

Figure 4:
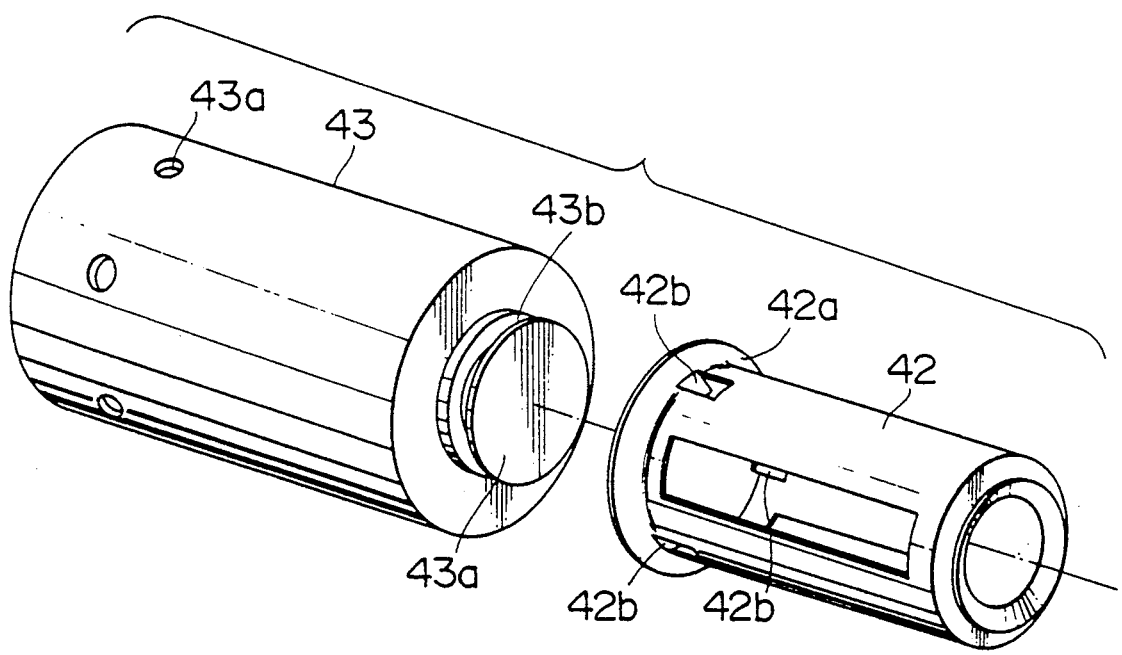
FIG. 4 is a lateral cross-sectional view showing the sleeve and the cap in a front elevation.

The primary piston 37 is fit with urging means 38. The urging means 38 is formed of a return spring 39 and a retainer 40 which is in turn formed of a bolt 41 and a cylinder 42. The bolt 41 and the cylinder 42 are coupled each other in a telescoping relationship, that is, undetachably and freely slidably coupled. The bolt 41 threadably engages the piston 37. A flange 42a is formed at a free end of said cylinder 42, and said spring 39 is disposed between the flange 42a and the piston 37. Moreover, a pawl 42b is defined through the base portion of the flange 42a of the cylinder 42, the pawl 42a being projected outwardly by undercutting the base portion in the peripheral direction at three points as shown in FIG. 4. On the other hand, a boss 43a is formed at the end surface of the secondary piston 43 adjacent to the primary piston 37, and an annular recess 43b is formed along the peripheral surface of the boss 43a. The pawl 42b of the cylinder 42 is received in the recess 43b and thereby integrating the cylinder 42 and the secondary piston 43.

Additionally, as shown in FIG. 1, the secondary piston 43 is likewise provided with urging means 44. The urging means 44 is also formed of a retainer spring 45 and a retainer 46 which is in turn formed of a bolt 47 and a cylinder 48. The bolt 47 and the cylinder 48 are coupled together with each other in a telescoping relationship, and the bolt 47 threadably engages the piston 43. A flange 48a is formed at the free end of the cylinder 48, and said spring 45 is disposed between the flange 48a and the piston 43.

Accordingly, said primary piston 37, the secondary piston 43 and urging means 38 and 44 are thus integrally formed.

Said primary piston 37 is guided in the cylinder housing 31 by the piston guide 49 and the sleeve 35, whereas the secondary piston 43 is guided by the piston guide 50. Packings 51 and 52 are arranged at opposite ends of the piston guide 49 for thereby providing a sealing effect between the piston guide 49 and the piston 37, whereas packings 53 and 54 are arranged between opposite end surfaces of the piston guide 50 for thereby providing a sealing effect between the piston guide 50 and the piston 43. The interior of the cylinder housing 31 is divided into a primary pressure chamber 55 and a secondary pressure chamber 56 by means of the piston guide 50 and the piston 43.

In the tandem type master cylinder 30 thus arranged. the primary pressure chamber 55 is communicated with the oil reservoir 57 via a passage 37a in the piston 37, a passage 49a in the piston guide 49, a recess 33c in the cap 33 and a passage 32h in the body 32, when it is in an inoperative condition. On the other hand, the secondary pressure chamber 56 is communicated with the oil reservoir 57 via a passage 43a in the piston 43, a passage 50a in the piston guide 50 and a passage 32i in the body 32.

In this master cylinder 30, when the primary piston 37 is caused to move in a leftward direction and the passage 37a of the piston 37 reaches the packing 52, communication between the pressure chamber 55 and the oil reservoir 57 is blocked, elevating a pressure inside the pressure chamber 55. Substantially at the same time, the secondary piston 43 is caused to move in a leftward direction and when the passage 43a of the packing 43 reaches the packing 54, a communication between the pressure chamber 56 and the oil reservoir 57 is blocked to elevate a pressure inside the pressure chamber 56. As a consequence, the oil in the pressure chambers 55 and 56 is pumped under pressure to each of the wheel cylinders (not shown) via ports 55a and 56a.

In order to disassemble such master cylinder 30 !or maintenance and the like, it is merely necessary to remove the cap 33 from the body 32. The cap 33 is thus removed together with the sleeve 35, and consequently the piston guide 49, and packings 51 and 52 which are between the sleeve 35 and the cap 33 are simultaneously removed. The primary piston 37 against which packings 51 and 52 are in abutment is pulled out together with the secondary piston 43 and its urging means 44. Moreover the secondary piston 43, packings 53 and 54 which are in abutment with the piston 43, and the piston guide 50 between these packings 53 and 54 are also pulled out.

That is, in the above-described tandem type master cylinder. when the cap 33 is removed from the body 32, all components in the cylinder housing 31 are simultaneously pulled out together with the removal of the cap 33.

Furthermore, in order to reattach the components after replacement etc., it is merely necessary to threadably engage the cap 33 having each of components fitted beforehand with the body 32. Then, the piston guide 50 enters into contact with the inner periphery 32e of the body 32 for centering it, while the sleeve 35 is contacted at its top end by the inner periphery 32d of the body 32 via the ring 36 for centering it. Furthermore, the piston guide 49 contacts with the inner periphery 33e of the cap 33 for centering it. Also, the piston guide 50, the sleeve 35 and the piston guide 49 are sandwiched between the body 32 and the cap 33 or thereby being located axially in position.

In the meantime, in the above-described embodiment, the number of lugs to be formed through the sleeve 35 is selected as seven, and five of which are positioned relative to the recess 33c of the cap 33 and remaining two of which are positioned in a position offset from the recess 33c. This arrangement ensures that remaining two lugs are reliably engaged in position in the annular groove 33d even when five of seven lugs correspond with the recess 33c. That is, in the above embodiment, at least two lugs 35a are used to ensure that the sleeve 35 does not disengage from the cap 33. However, in the present invention, the arrangement is not limited to the above-described locking mechanism, but it may also be available to form more than two lugs 35a at least one of which is placed in position so as not to correspond with the recess 33c of the cap 33. By so doing, it is ensured that one lug 35a is constantly and reliably received in the annular recess 33d in the cap 33, and thereby preventing the sleeve 35 from disengaging from the cap 33 irrespective of the rotating position of the sleeve 35 relative to the cap 33.

In the meantime, although the sleeve 35 is formed integrally with the cap 33 by engaging its lug 35a in the annular recess 33d in the above embodiment, the sleeve 35 should not essentially be formed integrally with the cap 33. The reason is that this sleeve 35 may be pulled out together with the piston guide 50 which is pulled out together with the cap 33, if the cap 33 and the piston guide 50 are pinched with fingers for removal.

Figure 5:
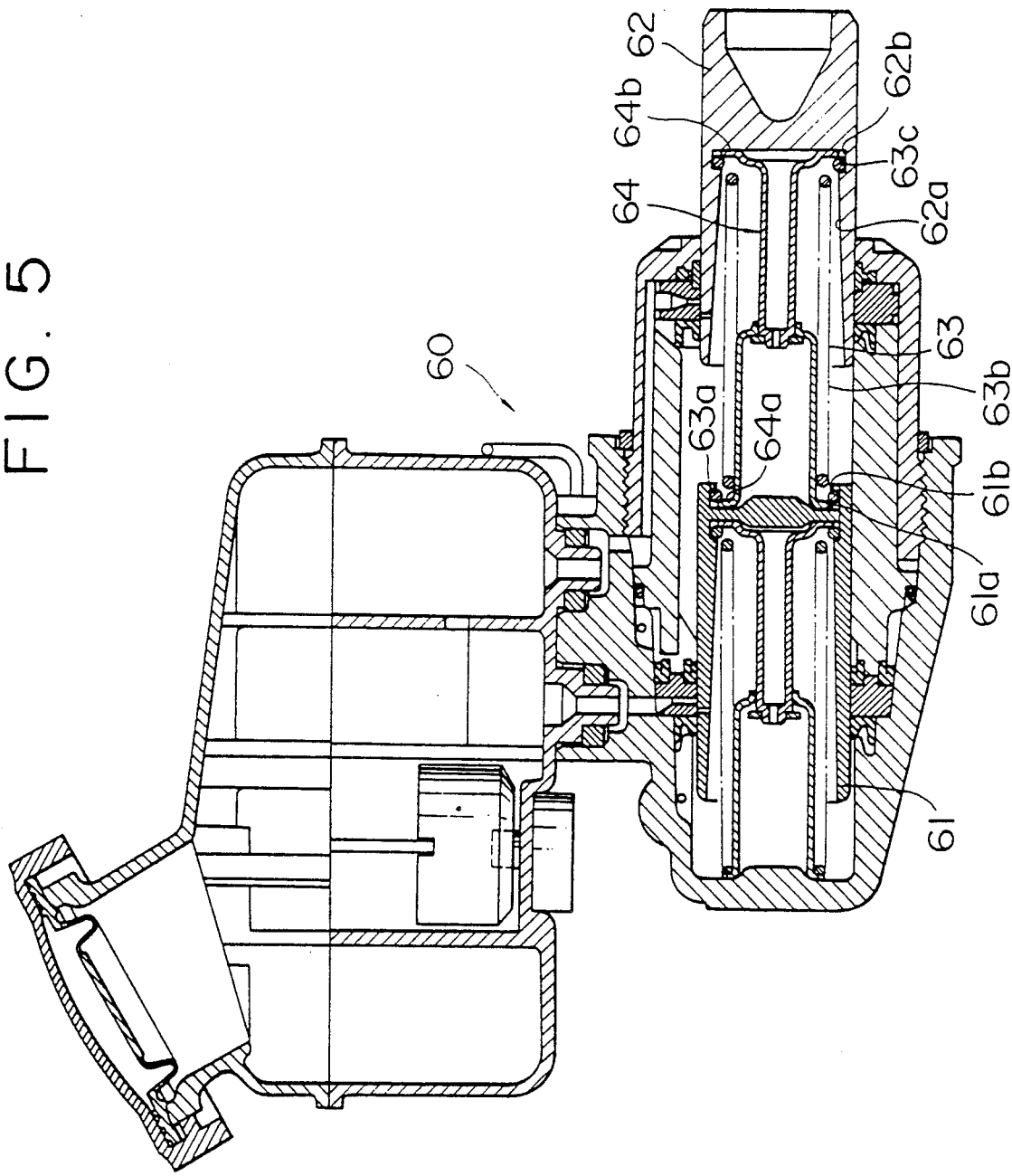
FIG. 5 is a longitudinal cross-sectional view showing an alternative embodiment of the tandem type master cylinder in accordance with the present invention.
Figure 6:
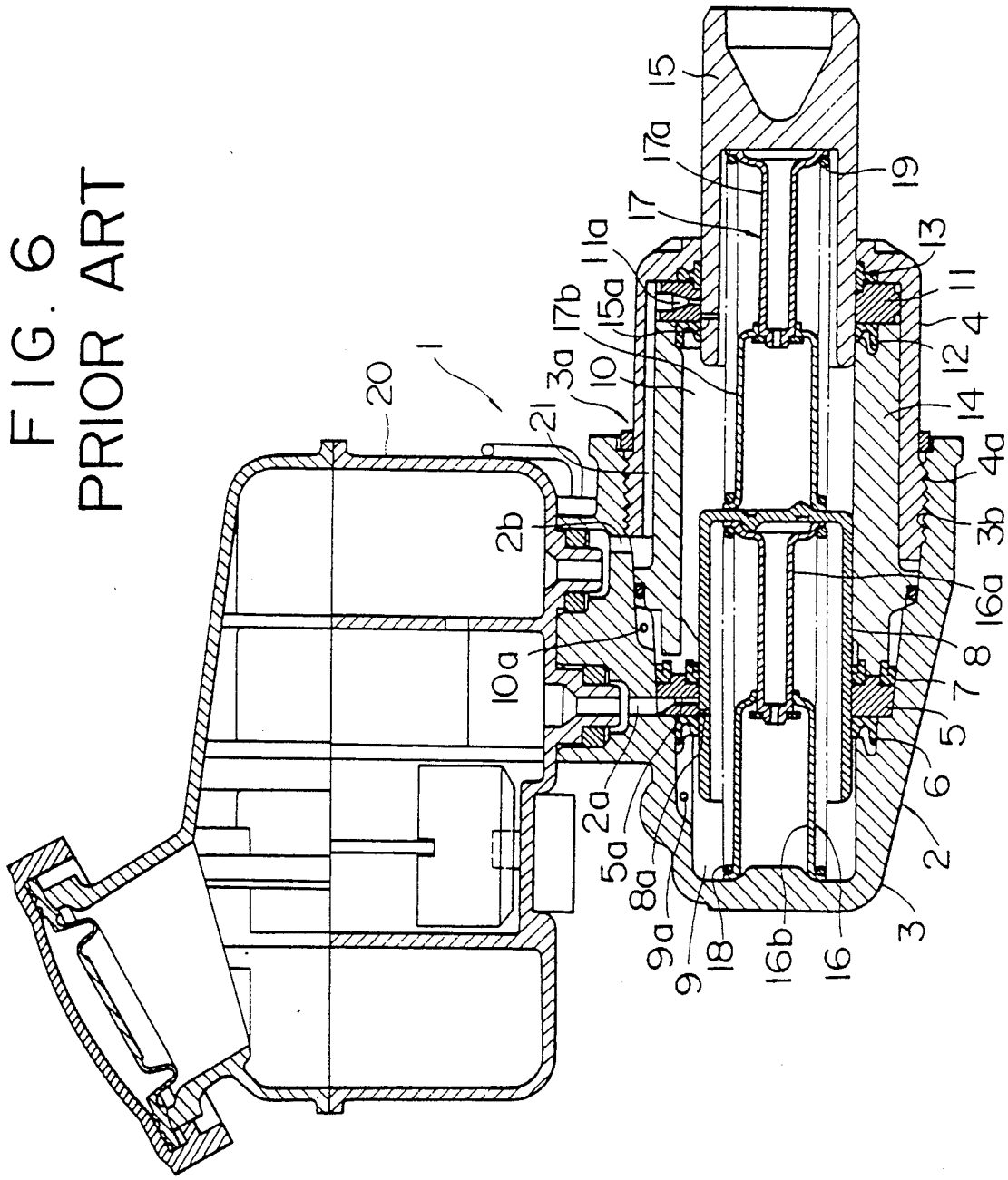
FIG. 6 is a longitudinal cross-sectional view showing the traditional master cylinder.

Also, in the tandem type master cylinder 30 the retainer 40 and the secondary piston 43 are coupled together by engaging a pawl 42b with the recess 43b in the secondary piston 43, the pawl 42b being defined in the cylindrical body 42 of the retainer 40, but it may also be possible to form such coupling by means of the construction shown in FIG. 5.

In the tandem type master cylinder 60 shown in FIG. 5, a recess 61a is formed through the end of the secondary piston 61 adjacent the primary piston, the recess 61a being used to receive one end 63a of the spring 63, and an annular groove 61b is defined through the inner peripheral wall of the recess 61a. A flange 64a is formed at one end of the retainer 64, whereas the coil diameter at one end 63a of the spring 63 is made larger than that at other portions 63b. The retainer 64 has its flange 64a received in the recess 61a in the secondary piston 61, and then one end 63a of the spring 63 is engaged in the annular groove 61b of the secondary piston 61, and thereby allowing it to be connected with the secondary piston 61. In other words, the flange 64a of the retainer 64 is sandwiched between one end 63a of the spring 63 and the bottom surface of the recess 61a of the secondary piston 61.

In the embodiment shown in FIG. 1 one portion oi the retainer 40 is formed by means of bolt 41, and the retainer 40 is coupled with the piston 37 by threading the bolt 41 on the primary piston 37. However, it may also be possible to form such coupling by means of the construction shown in FIG. 5.

A construction of coupling between the retainer 64 and the primary piston 62 as shown in FIG. 5 is substantially identical to that to be produced between the retainer 64 and the secondary piston 61 as shown in the same figure.

In the case of this master cylinder 60, because the recess 62a which is defined through the primary piston 62 for containing the opposite end 63c of the spring 63 is rather deep, and the recess 62a is tapered along its inner peripheral wall so as to guide an opposite end 63c of the spring 63. Then, the annular groove 62b is defined so as to be in contact with the bottom surface of the recess 62a.

According to this construction of coupling between the retainer 64 and the primary piston 62, the retainer 64 is connected with the primary piston 62a by containing the flange 64b formed at an opposite end of the retainer 64 in the recess 62a in the primary piston 62, and then an enlarged opposite end 63c of the spring 63 is received in the annular groove 62b. That is, the flange 64b of the retainer 64 is sandwiched between the opposite end 63c of the spring 63 and the bottom surface of the recess 62a in the primary piston 62.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A master cylinder comprising a body and a cap which is threadably attached on said body to form a cylinder housing, a synthetic resin sleeve received in said cap to locate the sleeve in said cylinder housing a piston freely slidably passing through said sleeve for locating the piston inside said cylinder housing, a plurality of lugs defined on the outer periphery of said sleeve and an annular groove defined on the entire inner periphery of said cap, said sleeve being attached to the cap by engaging said lug in said groove, and a plurality of recesses being defined on the inner periphery of said cap, the recesses being generally parallel to a longitudinal axis of the cap and extending inwardly from an open end thereof, only some of the plurality of lugs being arranged in a corresponding relationship with the recesses.

2. A tandem type master cylinder comprising a primary piston and a secondary piston arranged in tandem via urging means having a spring mounted upon a telescoping type retainer, said retainer being fixed at one end thereof on said primary piston, and a pawl being formed on an opposite end of said retainer, a secondary piston recess being defined in the end portion of said secondary piston and said pawl being received in the recess in order to connect said primary piston and said secondary piston.

3. A tandem type master cylinder as claimed in claim 2, wherein said secondary piston side portion of said retainer is formed by a cylindrical body, and said pawl is formed by inwardly cutting out the peripheral wall of the cylindrical body.

4. The tandem type master cylinder as claimed in claim 2, wherein a boss is formed at the end of said secondary piston adjacent to said primary piston, and said secondary piston recess is defined on the peripheral surface of said boss.

5. The tandem type master cylinder as claimed in claim 4, wherein said secondary piston recess is defined along the entire periphery of said boss.

6. The tandem master cylinder as claimed in claim 2, wherein the primary piston is formed with a primary piston recess for receiving the end of said spring adjacent to said primary piston, an annular groove is defined on the inner peripheral wall of the primary piston recess, the coil diameter of said spring at an end adjacent to the primary piston is larger than that at the other portion, the end of the spring adjacent to said primary piston is received in the annular groove in said primary piston, and the flange of the retainer adjacent to said primary piston is thereby sandwiched between the spring and the primary piston.

7. A tandem type master cylinder comprising a primary piston and a secondary piston arranged in tandem with an intervention of urging means having a spring mounted upon a telescoping type retainer, said secondary piston is formed with a secondary piston recess for receiving the end of said spring adjacent to said secondary piston, an annular groove is defined on the inner peripheral wall of the secondary piston recess, a flange is formed at the end of said retainer adjacent to said secondary piston, the coil diameter of said spring at an end adjacent to the secondary piston is larger than that t the other portion, the end of the spring adjacent to said secondary piston is received in the annular groove in said secondary piston, and the flange of the retainer adjacent to said secondary piston is thereby sandwiched between the spring and said secondary piston.

8. The tandem master cylinder as claimed in claim 7, wherein said primary piston is formed with a primary piston recess for receiving the end of said spring adjacent to said primary piston, an annular groove is defined on the inner peripheral wall of the primary piston recess, a flange if formed at the end of said retainer adjacent to said primary piston, the coil diameter of said spring at an end adjacent to the primary piston is larger than that at the other portion, the end of the spring adjacent to said primary piston is received in the annular groove in said primary piston, and the flange of the retainer adjacent to said primary piston is thereby sandwiched between the spring and the primary piston.

9. A tandem type master cylinder comprising a body and a cap threadably attached on said body to form a cylinder housing, a synthetic resin sleeve received in said cap to locate the sleeve in said cylinder housing, a primary piston and a secondary piston arranged in tandem with an intervention of urging means having a spring mounted upon a telescoping type retainer, a piston freely slidably passing through the sleeve for locating the piston in position inside the cylinder housing, a lug being defined on the outer periphery of said sleeve and a groove is defined on the inner periphery of the cap, and said sleeve being attached to the cap by engaging said lug in the groove, one end of said retainer being fixed on said primary piston, and a pawl being formed on an opposite end thereof, a secondary piston recess being formed in the end portion of said secondary piston and said pawl being received in said secondary piston recess for connecting said primary piston and said secondary piston.

10. The tandem type master cylinder as claimed in claim 9, wherein said groove is an annular groove defined on the entire periphery of said cap.

11. The tandem type master cylinder as claimed in claim 10, further comprising a plurality of cap recesses extending inwardly from the open end of the cap defined on the inner periphery of said cap, said cap recesses being generally parallel to a longitudinal axis of the cap and said lug being defined in a plural number, only some of said lugs being arranged in a corresponding relationship relative to said cap recess.

12. The tandem type master cylinder as claimed in claim 9, wherein the end of said retainer adjacent to said secondary piston is formed by a cylindrical body, and said pawl is formed by cutting out the peripheral wall of said cylindrical body inwardly.

13. The tandem type master cylinder as claimed in claim 9, wherein a boss is defined at the end surface of said secondary piston adjacent to said primary piston, and said secondary piston recess is defined on the peripheral surface of said boss.

14. The tandem type master cylinder as claimed in claim 13, wherein said secondary piston recess is defined along the entire periphery of said boss.

15. The tandem type master cylinder as claimed in claim 9, wherein said primary piston is formed with a primary piston recess for receiving the end of said spring adjacent to said primary piston, a flange is formed at the end of said retainer adjacent to said primary piston, an annular groove is defined on the inner peripheral wall of the primary piston recess, the coil diameter of said spring at one end adjacent to said primary piston is larger than that at the other portion, the end of the spring adjacent to said primary piston is received in the annular groove in said primary piston, and the flange of the retainer adjacent to said primary piston is thereby sandwiched between the spring and the primary piston.

16. A tandem type master cylinder comprising a body and a cap threadably attached on said body to form a cylinder housing, a synthetic resin sleeve received in said cap to locate the sleeve in said cylinder housing, a primary piston and a secondary piston arranged in tandem with an intervention of urging means having a spring mounted upon a telescoping type retainer, and said primary piston is freely slidably passing through the sleeve, the end of said secondary piston adjacent to said primary piston being formed with a secondary piston recess for receiving the end of said spring adjacent to said secondary piston, an annular groove being defined o the inner peripheral wall of the secondary piston recess, a flange being formed at the end of said retainer adjacent to said secondary piston, the coil diameter of said spring at one end adjacent to said secondary piston being larger than that at the other portion, the end of said spring adjacent to said secondary piston being received in the annular groove in said secondary piston, and the flange of the retainer adjacent to said secondary piston thereby being sandwiched between the spring and the secondary piston.

17. The tandem type master cylinder as claimed in claim 16, wherein said groove is an annular groove defined on the entire periphery of said cap.

18. The tandem type master cylinder as claimed in claim 17, further comprising a plurality of cap recesses extending inwardly from the open end of the cap defined on the inner periphery of said cap, said cap recesses being generally parallel to a longitudinal axis of the cap and said lug being defined in a plural number, only some of said lugs being arranged in a corresponding relationship relative to said cap recess.

19. The tandem type master cylinder as claimed in claim 18, wherein said primary piston is formed with a primary piston recess for receiving the end of said spring adjacent to said primary piston, an annular groove is defined on the inner peripheral wall of the primary piston recess, a flange if formed at the end of said retainer adjacent to said primary piston, the coil diameter of said spring at an end adjacent to said primary piston is larger than that at other portions, the end of the spring adjacent to said primary piston is received in the annular groove in said primary piston, and the flange of said retainer adjacent to said primary piston is thereby sandwiched between the spring and the primary piston.

* * * * *